United States Patent [19]
Fontana

[11] Patent Number: 5,630,291
[45] Date of Patent: May 20, 1997

[54] CANDELABRA FLOWER HOLDER

[76] Inventor: Shirley E. Fontana, 1404 Madison Ave., Metairie, La. 70001

[21] Appl. No.: 567,274

[22] Filed: Dec. 5, 1995

[51] Int. Cl.⁶ .................................. A01G 5/04; A47G 7/02
[52] U.S. Cl. .................. 47/41.01; 47/41.13; 206/423; 211/60.1; 248/27.8; D11/143; D11/144; D11/146; D26/9; D26/10
[58] Field of Search ..................... 211/60.1, 205; 248/27.8, 450, 158, 177.1, 218.4, 214; 206/564, 423; D26/9, 10, 11; D11/143, 144, 146, 153; 47/41.01

[56] References Cited

U.S. PATENT DOCUMENTS

| D. 156,472 | 12/1949 | Wolter | D26/10 |
|---|---|---|---|
| D. 190,821 | 7/1961 | Saxe | D26/10 |
| D. 200,720 | 3/1965 | Henning | D26/10 |
| 2,553,103 | 5/1951 | Miller | 248/27.8 |
| 2,874,267 | 2/1959 | Shipley | 47/41.13 |
| 3,091,106 | 5/1963 | Crouch | 67/25 |
| 3,574,498 | 4/1971 | Zarinsky | 431/126 |
| 3,695,458 | 10/1972 | Nagel | 211/177 |
| 3,929,230 | 12/1975 | Luthi | 211/177 |
| 4,138,019 | 2/1979 | Smith | 248/214 |
| 4,461,118 | 7/1984 | Fertig | D11/153 |

FOREIGN PATENT DOCUMENTS

| 273434 | 1/1927 | United Kingdom | 211/205 |

*Primary Examiner*—Robert W. Gibson, Jr.
*Assistant Examiner*—Donald J. Wallace
*Attorney, Agent, or Firm*—Joseph N. Breaux

[57] ABSTRACT

A candelabra flower holder comprising: a base member having a column extending outwardly therefrom having an internally threaded bore formed into the distal end thereof; at least one J-shaped flower display member, each having an attachment aperture formed through the central section thereof and a plurality of flower mounting holes formed through the longest vertical section thereof; and a candle holder member having a threaded rod extending from one end thereof that is positionable sequentially through each of the attachment apertures of the flower display members and then screwable into the threaded bore of the column, and a candle receiving aperture at an opposite end thereof. The base member and column may be replaced with a base member having a candle stick aperture insertion portion sized to frictionally fit within the convention candle base holding aperture of the candle stick.

2 Claims, 1 Drawing Sheet

CANDELABRA FLOWER HOLDER

TECHNICAL FIELD

The present invention relates to devices for displaying flowers and candles and more particularly to a candelabra type device having a removable candle holder that is securable to a base column in a manner to secure a number of flower holding members to the base column.

BACKGROUND ART

When decorating for social occasions, such as weddings, anniversaries, and parties, it is often desirable to use candles and flowers arranged at strategic locations throughout the room. It is desirable on occasion to display both flowers and candles in close proximity. It would be a benefit, therefore, to have a portable, combination candelabra flower holder that may be positioned at a location by a user and configured to display both flowers and candles simultaneously. In addition, because flower displays may be viewed from one or more angles, it would be a benefit if the candelabra flower holder could be configured by the user to display flowers from one or more sides. In addition, it would be desirable to convert an existing candle stick to such a candelabra flower holder.

GENERAL SUMMARY DISCUSSION OF INVENTION

It is thus an object of the invention to provide a candelabra flower holder that is portable and may be configured to display flowers and candles either alone or in combination.

It is a further object of the invention to provide a candelabra flower holder that is configureable to display flowers from any or all four sides.

It is a still further object of the invention to provide a candelabra flower holder that accomplishes both the above objects in combination.

It is a further object of the invention to provide a candelabra flower holder adapter kit that may be used to convert an existing candle stick into a candelabra flower holder of the present invention.

Accordingly, in one aspect of the invention a candelabra flower holder is provided. The candelabra flower holder comprises: a base member including a column extending outwardly therefrom having an internally threaded bore formed into the distal end thereof; at least one J-shaped flower display member, each having an attachment aperture formed through the central section thereof and a plurality of flower mounting holes formed through the longest vertical section thereof; and a candle holder member including a threaded rod, extending from one end thereof that is positionable sequentially through each of the attachment apertures of the flower display members and then screwable into the threaded bore of the column, and a candle receiving aperture at an opposite end thereof. The candle holder member preferably has external ornamentation if desired.

In another aspect of the invention an adapter kit for converting a conventional candle stick into a candelabra flower holder embodying the present invention is provided. The adapter kit includes a base member having a candle stick aperture insertion portion sized to frictionally fit within the convention candle base holding aperture of the candle stick and an internally threaded bore formed into the distal end thereof; at least one J-shaped flower display member, each having an attachment aperture formed through the central section thereof and a plurality of flower mounting holes formed through the longest vertical section thereof; and a candle holder member including a threaded rod, extending from one end thereof that is positionable sequentially through each of the attachment apertures of the J-shaped flower display members and then screwable into the threaded bore of the column, and a candle receiving aperture at an opposite end thereof.

BRIEF DESCRIPTION OF DRAWINGS

For a further understanding of the nature and objects of the present invention, reference should be had to the following detailed description, taken in conjunction with the accompanying drawings, in which like elements are given the same or analogous reference numbers and wherein.

EXEMPLARY MODE FOR CARRYING OUT THE INVENTION

Figure 1:
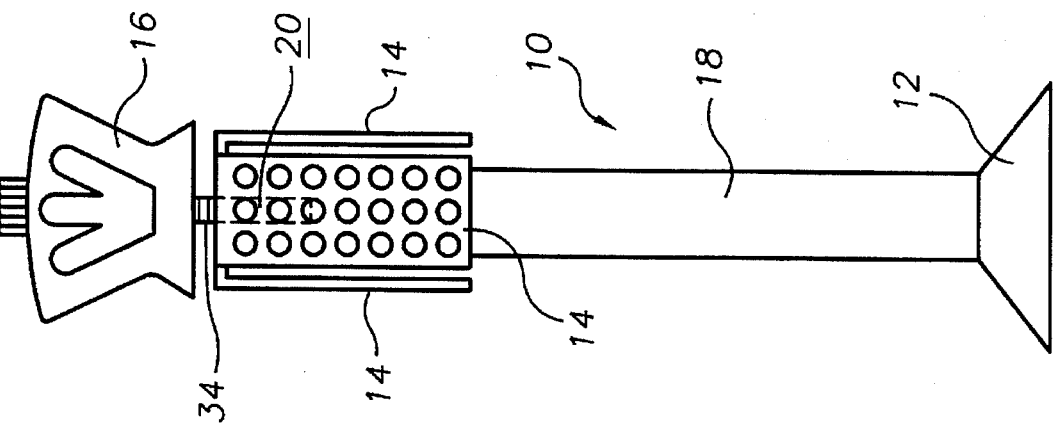
FIG. 1 is a side view of an exemplary embodiment of the candelabra flower holder of the present invention including the base member, three J-shaped flower display members and a candle holder member.

FIG. 1 is a side view of an exemplary embodiment of the candelabra flower holder of the present invention generally designated by the numeral 10. Flower holder 10 includes a base member 12, three J-shaped flower display members 14, and a candle holder member 16. Base member 12 has a support column 18 extending outwardly therefrom. The distal end of column 18 has an internally threaded bore 20 (shown in outline) formed therein.

Figure 2:
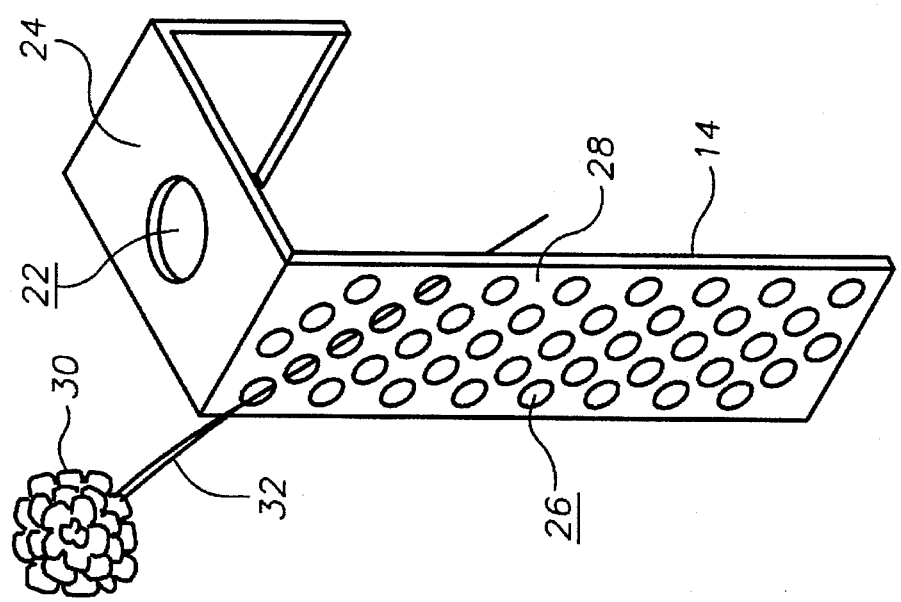
FIG. 2 is a perspective view of one of the J-shaped flower display members in isolation with the stem of a representative flower disposed through one of the flower mounting holes.

With reference to FIG. 2, each J-shaped flower display member 14 has an attachment aperture 22 formed through a central section 24 thereof and a group of flower mounting holes 26 formed through the longest vertical section 28 thereof. Also shown in the figure is a representative flower 30 having a stem 32 inserted into one of the flower mounting holes 26. In use, a group of flowers may be arranged by inserting the stem of the flower into a desired flower mounting hole 26.

With reference once again to FIG. 1, candle holder member 16 includes a threaded rod 34 that extends from one end of candle holder member 16. Threaded rod 34 is positionable sequentially through each of the attachment apertures 22 of each of the three J-shaped flower display members 14 and then screwable into threaded bore 20. J-shaped flower display members 14 are thereby secured in the desired display configuration by compression of the central sections 24 between column 18 and candle holder member 16. Candle holder member 16 is provided with a candle receiving aperture 36 at the opposite end thereof. It should be appreciated by one of ordinary skill in the art that candle holder member 16 may be utilized in conjunction with base member 12 without any J-shaped flower display members 14 and that a flower arrangement may be inserted into candle receiving aperture 36 instead of the base section of a candle.

Figure 3:
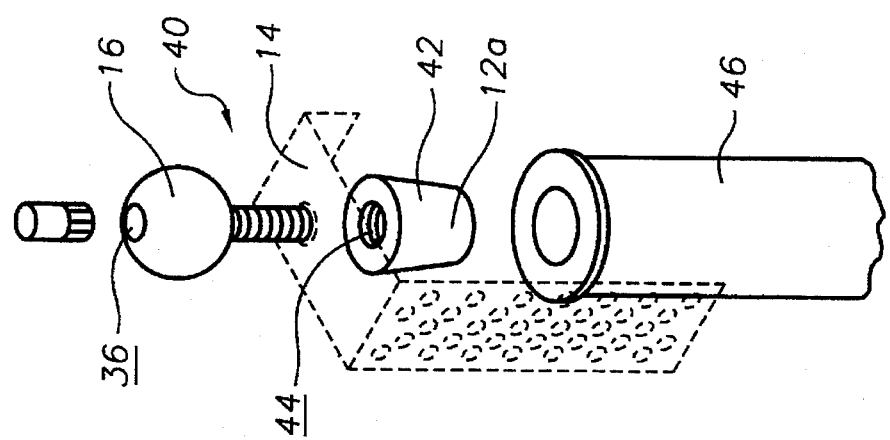
FIG. 3 is a perspective view of an exemplary embodiment of the candle stick conversion kit of the present invention including the base member having the candlestick aperture insertion portion, the J-shaped flower display member, and the candle holder member.

FIG. 3 shows an exemplary embodiment of the candle stick adapter kit of the present invention generally designated by the numeral 40. Adapter kit 40 includes a candle holder member 16, including a candle receiving aperture 36, and a J-shaped flower display member 14 as previously described. The base member 12a includes a candle stick aperture insertion portion 42. Insertion portion 42 is sized to frictionally fit within a conventional candle base holding aperture 44 of a conventional candle stick 46. With insertion portion 42 thus inserted, the base member 12a and conventional candle stick combination is used in the same manner as previous base member 12.

It can be seen from the preceding description that a candelabra flower holder has been provided that is portable; that is configurable to display flowers and candles either alone or in combination; and that is configureable to display flowers from any or all four sides. An adaptor kit for converting an existing candle stick into a candelabra flower holder of the present invention has also been provided.

It is noted that the embodiment of the candelabra flower holder described herein in detail for exemplary purposes is of course subject to many different variations in structure, design, application and methodology. Because many varying and different embodiments may be made within the scope of the inventive concept(s) herein taught, and because many modifications may be made in the embodiment herein detailed in accordance with the descriptive requirements of the law, it is to be understood that the details herein are to be interpreted as illustrative and not in a limiting sense.

What is claimed is:

1. A candelabra flower holder comprising:
    a base member including a column extending outwardly therefrom having an internally threaded bore formed into a distal end thereof;
    at least one J-shaped flower display member, having an attachment aperture formed through a central section thereof and a plurality of flower mounting holes formed through a longest vertical section thereof; and
    a candle holder member including a threaded rod, extending from one end thereof, that is positionable sequentially through the attachment aperture of the at least one flower display member and then screwable into the threaded bore of the column, and a candle receiving aperture at an opposite end thereof.

2. An adapter kit for adapting a conventional candle stick into a candelabra flower holder, said kit comprising:
    a base member having a candle stick aperture insertion portion sized to frictionally fit within a conventional candle base holding aperture of a candle stick and an internally threaded bore formed into a distal end of said base member;
    at least one J-shaped flower display member having an attachment aperture formed through a central section thereof and a plurality of flower mounting holes formed through a longest vertical section thereof; and
    a candle holder member including a threaded rod, extending from one end thereof, that is positionable sequentially through the attachment aperture of the at least one J-shaped flower display member and then screwable into the threaded bore of the base member, and a candle receiving aperture at an opposite end thereof.

* * * * *